J. B. KINCAID.
LOCK NUT AND BOLT.
APPLICATION FILED SEPT. 12, 1917.

1,281,171.

Patented Oct. 8, 1918.

Inventor
J. B. Kincaid,
By H. L. Woodward
Attorney

UNITED STATES PATENT OFFICE.

JOHN B. KINCAID, OF ATLANTA, GEORGIA.

LOCK NUT AND BOLT.

1,281,171.  Specification of Letters Patent.  Patented Oct. 8, 1918.

Application filed September 12, 1917. Serial No. 190,948.

*To all whom it may concern:*

Be it known that I, JOHN B. KINCAID, a citizen of the United States, residing at Atlanta, in the county of Fulton and State of Georgia, have invented certain new and useful Improvements in Lock Nuts and Bolts, of which the following is a specification.

The invention has for an object to provide a form of lock nut in which a positive locking of the bolt and nut against movement in a predetermined direction will be induced by forces tending to rotate the parts in the undesired direction. It is a further important object to give a construction of locking means which is adapted to repeated use, and which may be readily operated to permit unscrewing of a nut when desired. A further aim is to give a construction of locking device adapted to be manipulated with great ease for its various uses.

Additional objects, advantages and features of invention will appear from the construction, arrangement and combination of parts hereinafter described and shown in the drawings, wherein.

Figure 1:
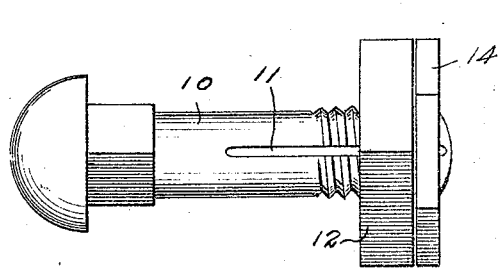
Figure 1 is an elevational view of one form of my appliance.
Figure 2:
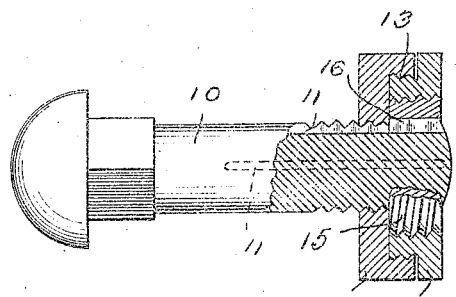
Fig. 2 is a similar view partly in section.
Figure 5:
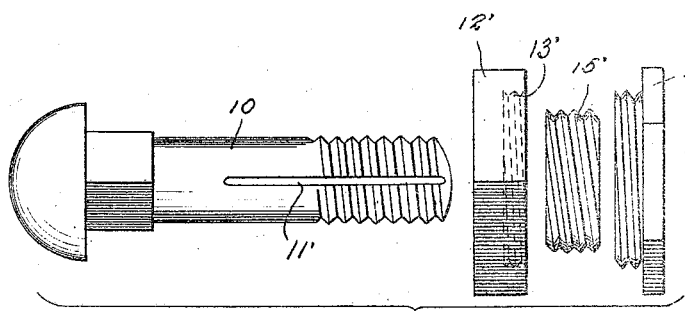
Fig. 5 is a view similar to Fig. 4, of a further form of the device adapted to operate against rotation of the nut in the direction opposite to that for which the first mentioned forms of the device are operated.
Figure 3:
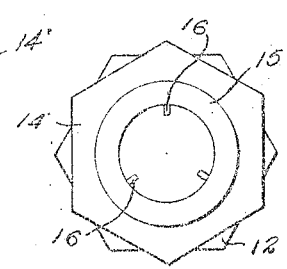
Fig. 3 is an end view thereof.
Figure 4:
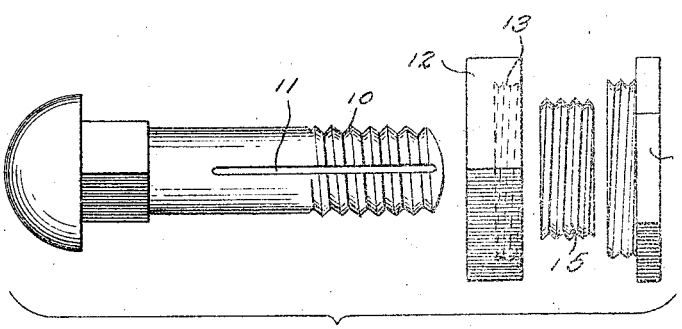
Fig. 4 is a view showing the parts disassembled.

There is illustrated in Figs. 1 to 4, a locking device adapted to operate to prevent a nut from screwing upon a bolt farther than a predetermined desired position, while in Fig. 5 the construction illustrated is adapted to prevent unscrewing of the nut after being adjusted to position upon the bolt. The bolt 10 may be of any ordinary type as far as proportions are concerned. It has right hand threads and is provided with one or more longitudinal grooves 11 extending throughout its threaded portion. The nut element has a simple right hand threaded opening through its inner part adapted to screw snugly upon the bolt, in the ordinary way, and is formed for engagement with any usual form of wrench. At the outer part of the nut, however, an interiorly threaded recess 13 is formed, into which there is screwed a locking nut 14, having threads thereon adapted to engage those of the recess 13 snugly, the threads of the recess and nut being left handed in the present instance, and this nut is also formed with a central opening much larger than the bolt 10, also interiorly threaded in the same direction and pitch as the external thread thereon. Slidable upon the bolt there is a locking sleeve 15, having external left hand threads adapted to engage snugly the interior threads of the nut 14, and being provided also with splines 16, adapted to engage slidably in the grooves 11 of the bolt. The nut 14 is preferably of a size to project outwardly from the recess 13 of the nut 12 when screwed fully into the last mentioned nut. The sleeve 15 is preferably at least as long as the nut 14, although this is not essential.

In the use of this form of the device, the bolt being engaged with its work and the nut 12 screwed upon the bolt as far as desired the sleeve 15 is adjusted upon the projecting end of the bolt outwardly of the recess 13 and moved inwardly until it abuts snugly against the nut 12 within the recess 13. The nut 14 is then engaged upon the outer part of the sleeve 15 and screwed inwardly thereon, and also screwed into the nut 12, this movement being readily permitted by reason of the fact that the pitch of the threads of the recess 13 and of the sleeve 15 is the same. Should it be found that relative movement of the nut upon the bolt is permitted before locking action occurs, the lock nut and sleeve may be removed by an operation the reverse of that described, and the sleeve adjusted upon the bolt in a new position, allowing proper engagement of the nuts 12 and 14 to insure snug relation of the parts as nearly as may be, so that a minimum of lost motion will be permitted before locking action efficiently occurs.

After screwing of the parts together as described, it will be seen that should an attempt be made to screw the bolt 10 farther into the nut 12, such movement will cause the grooves of the bolt to engage the splines of the sleeve 15, tending to rotate it within the nut 14 and to move the sleeve inwardly against the end of the nut, resulting in an immediate binding, and should the friction between the sleeve 15 and nut 14 be less than the friction between the nuts 14 and 12, similar obstructing action will be caused by the fact that the nut 14 will also tend to move inwardly drawing the sleeve inwardly against the end of the bolt.

In Fig. 5 the construction of the parts is the same as before described, excepting that the sleeve 15' corresponding to the sleeve 15 before mentioned is provided with external right hand threads of a greater pitch than the pitch of the threads of the bolt 10, and the recess within the nut 12' is correspondingly threaded, as well as the interior and exterior of the nut 14', which corresponds to the nut 14 before mentioned. The sleeve 15' also shows the use of double threads in the present instance.

In the use of the last mentioned form of device, it will be seen that after a bolt is adjusted in place with the nut 12' screwed thereupon as desired, the sleeve 15' may be slipped upon the projecting end of the bolt as before described and the nut 14' screwed into the recessed nut 12'. Any tendency of the nut 12' to unscrew from the bolt will then tend to produce a relative longitudinal movement between the bolt and the sleeve 15' either by rotation of the sleeve in the nut 14' or by rotation of the nut 14' in the nut 12', causing the end of the sleeve to bear very forcibly against the end of the bolt 10, and checking the unscrewing motion.

What is claimed is:

A bolt and nut lock comprising a threaded bolt having longitudinal guide slots therein, a nut therefor, a sliding sleeve for the end of the bolt having splines for engagement with said slots, and a lock nut for engagement upon said sleeve, said lock nut and first mentioned nut being constructed for threaded coengagement, the threads of the lock nut in engagement with said sleeve and first mentioned nut being of the same pitch and direction, yet differing from those of the bolt, whereby tendency of the bolt and first mentioned nut to rotate in an undesired direction will produce relative approaching longitudinal movement of said sleeve and bolt.

In testimony whereof I have affixed my signature in presence of two witnesses.

JOHN B. KINCAID.

Witnesses:
G. ROPFILBAUM,
P. M. HUBBARD.